No. 835,893. PATENTED NOV. 13, 1906.
H. F. SEGERT.
MILK COOLER.
APPLICATION FILED SEPT. 10, 1906.
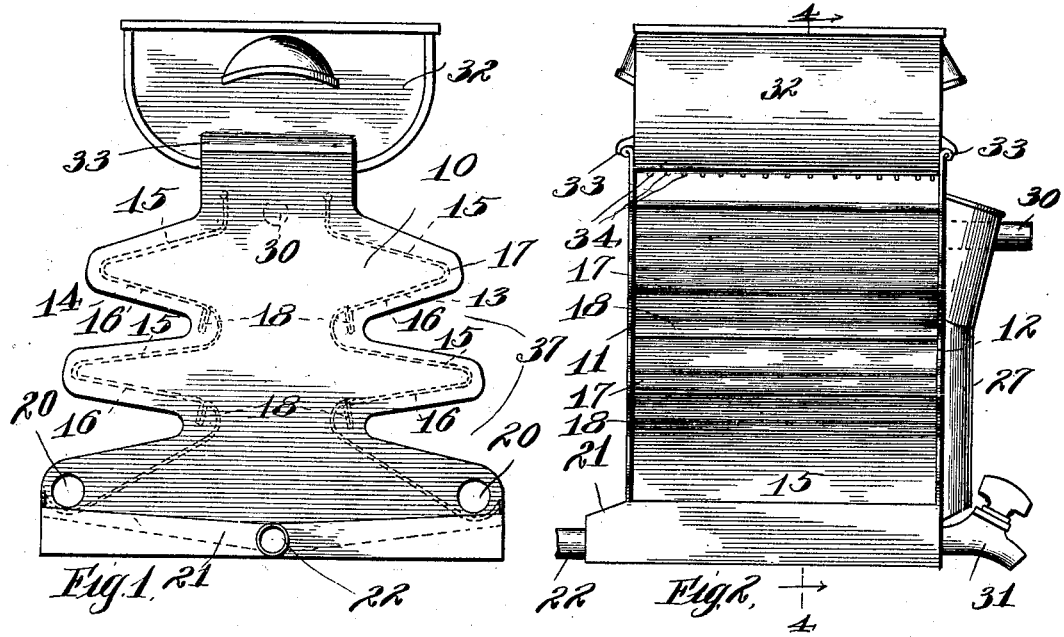
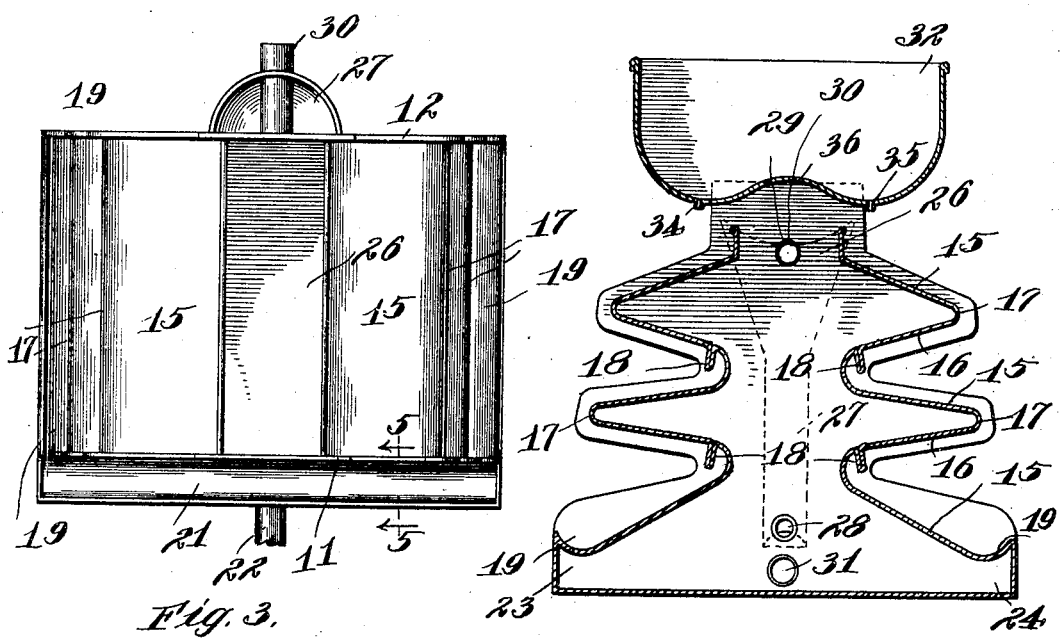
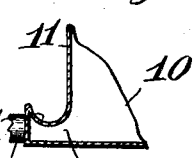
Witnesses:
G. W. Rauberschmidt,
Charles B. Gillson.
Inventor:
Henry F. Segert,
By Louis K. Gillson
Atty
THE NORRIS PETERS CO., WASHINGTON, D. C.

UNITED STATES PATENT OFFICE.

HENRY F. SEGERT, OF LIBERTYVILLE, ILLINOIS.

MILK-COOLER.

No. 835,893.  Specification of Letters Patent.  Patented Nov. 13, 1906.

Application filed September 10, 1906. Serial No. 333,966.

*To all whom it may concern:*

Be it known that I, HENRY F. SEGERT, a citizen of the United States, and a resident of Libertyville, county of Lake, and State of Illinois, have invented certain new and useful Improvements in Milk-Coolers, of which the following is a specification, and which are illustrated in the accompanying drawings, forming a part thereof.

This invention relates to those devices for cooling and purifying liquids in which there is provided a cooled inclined surface over which the liquid may be caused to flow in a thin stream.

The object of the invention is to provide apparatus for the treatment of fresh milk preliminary to its being bottled for shipment to the trade, this treatment being intended to lower its temperature and to destroy its animal odor and the flavor of vegetables eaten by the cattle from which it has been obtained.

The invention contemplates a cooling device having a plurality of inclined cooling-surfaces and means for causing the liquid to be treated to drop or flow in a thin stream from one of these surfaces to the next adjacent in order that it may be purified by intimate contact with the air.

The invention is exemplified in the structure to be hereinafter described, and illustrated in the accompanying drawings, in which—

Figure 1 is an end elevation of a milk-cooler constructed according to the invention. Fig. 2 is a side elevation of the same. Fig. 3 is a plan view, some of the parts being removed. Fig. 4 is a sectional view on the line 4 4 of Fig. 2, and Fig. 5 is a detail cross-section on the line 5 5 of Fig. 3.

As shown in the drawings, there is provided a receptacle 10 for a cooling medium, preferably formed of sheet metal and having end walls 11 and 12 and side walls 13 14. The side walls, as shown, are each curved to form a plurality of downwardly and forwardly inclined surfaces 15 15 and downwardly and backwardly inclined surfaces 16 16.

Each of the downwardly and backwardly inclined surfaces 16 is connected to the next higher downwardly and forwardly inclined surface 15 by means of a rounded edge 17, and a rib 18 is formed near the rear of each of the downwardly and backwardly inclined surfaces, preferably by means of a fold in the material from which the walls of the receptacle are formed. This rib or fold is preferably transverse to the direction of incline of the surface upon which it is formed and, as shown, extends along the surface for its entire length. It provides means for interrupting the stream of liquid flowing upon the surface and causes it to drop through the air to the next lower cooling-surface.

A drain 19 is provided for collecting the liquid from the forward edge of each of the lowest cooling-surfaces 15. As most clearly shown in Fig. 4, these drains are formed by suitably curving the side walls of the receptacle, and each connects, by means of an opening 20 in the end wall 11, with a trough 21, extending across the end of the receptacle and having a discharge-nipple 22. The drains 19 and the trough 21 are preferably so formed upon the receptacle that the cooling medium which it contains may have free access to their walls, as indicated at 23 24 in Fig. 4 and at 25, Fig. 5.

The top of the receptacle is preferably left open, as indicated at 26, to permit access to its interior, and to provide for the circulation of cold water within the receptacle a funnel 27 is formed upon the end wall 12 and communicates with its interior by means of an opening 28. An overflow-opening 29 is formed in the end wall 12 just below the level of the upper edges of the side walls 13 14; and, as shown, this communicates with a discharge-tube 30, which crosses the funnel 27. A drain-cock 31 is shown as being provided near the base of the receptacle for drawing off its contents.

Preferably there is associated with the device a receiving bowl or basin 32, which, as shown, is removably attached thereto by means of a pair of sockets 33, formed on the end walls of the basin and adapted to receive the upper edges of the end walls of the receptacle, as most clearly shown in Fig. 2. The floor of the basin may be provided with a double row of perforations 34 35, one of which when the basin is in place is just over the inner and upper edge of the highest inclined surface of each of the two side walls 13 14 of the receptacle 10. In order that the entire contents of the basin may be discharged equally through these openings onto the walls of the receptacle, the floor of the basin is curved upwardly between these two rows of openings, as indicated at 36, Fig. 4.

In use the liquid to be treated will be caused to flow in a thin stream over the outer surface of the two side walls 13 14 of the receptacle, preferably by being delivered to the receiving-basin 32, from which it will run or drop through the openings 34 35 in its floor. The liquid in flowing over the side walls of the structure will follow their contour, except when interrupted by the ribs 18, from the edges of which it will drip onto the next lower inclined cooling-surface. The trough 21, extending across the end of the receptacle, provides means for collecting the liquid which has passed over both of its side walls, and the device will preferably be so placed that the discharge-spout 22 will deliver to a suitable storage-tank. (Not shown.)

Commonly when the device is in use a circulation of cold water will be maintained within the interior of the receptacle 10 by directing a stream of running water into the mouth of the funnel 27 and permitting it to overflow from the interior of the receptacle through the discharge-tube 30. As the cooling-water having the lowest temperature is delivered to the receptacle near its base it will come in contact with those walls of the receptacle over which that part of the liquid to be treated is flowing, which has already been somewhat cooled, and the most efficient use is therefore made of the cooling medium. To facilitate the c'eaning of the inclined surfaces 15 16, the end walls of the structure are cut away or serrated between these surfaces, as indicated at 37, Fig. 1.

If desired, a heated fluid may be employed within the receptacle 10 and the device then used as a sterilizer or pasteurizer.

I claim as my invention—

1. In a milk-cooler, the combination with a downwardly and backwardly inclined cooled surface, of a rib extending across the surface at an angle to the direction of its incline.

2. In a milk-cooler, the combination with a downwardly and backwardly inclined cooled surface, of a rib extending across the surface at an angle to the direction of its incline, and a downwardly and forwardly inclined cooled surface below the rib and spaced apart from its edge.

3. In a milk-cooler, in combination, a receptacle for a cooling medium having opposed sinuous side walls, a receiving-basin having openings delivering to the outer surface of each of such walls, a drain receiving from each of the wal's, and a trough connecting the drains and having a discharge-opening, the walls of the drains and of the trough being adapted for contact with the cooling material contained within the receptacle.

4. A milk-cooler comprising a receptacle for a cooling medium, a wall of the receptacle having a plurality of downwardly and forwardly inclined and downwardly and backwardly inclined portions, each of the downwardly and backwardly inclined portions being connected to a higher downwardly and forwardly inclined portion by a rounded edge and having a rib extending at an angle to the direction of its incline, the edge of the rib being spaced apart from the next lower downwardly and forwardly inclined portion of the wall

HENRY F. SEGERT.

Witnesses:
W. C. ACHEN,
HARRY MEADE.